United States Patent
Hermann

(10) Patent No.: US 9,714,722 B2
(45) Date of Patent: Jul. 25, 2017

(54) PILOT VALVE AND/OR PROPORTIONAL VALVE

(71) Applicant: Voith Patent GmbH, Heidenheim (DE)

(72) Inventor: Jakob Hermann, Dettenhausen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/640,540

(22) Filed: Mar. 6, 2015

(65) Prior Publication Data

US 2015/0184773 A1 Jul. 2, 2015

Related U.S. Application Data

(63) Continuation of application No. PCT/EP2013/067875, filed on Aug. 29, 2013.

(30) Foreign Application Priority Data

Sep. 7, 2012 (DE) .................. 10 2012 017 705

(51) Int. Cl.
*F16K 31/524* (2006.01)
*F16K 31/52* (2006.01)
*F16K 11/07* (2006.01)

(52) U.S. Cl.
CPC ........ *F16K 31/52483* (2013.01); *F16K 11/07* (2013.01); *F16K 31/523* (2013.01)

(58) Field of Classification Search
CPC ............. F16K 31/523; F16K 31/52416; F16K 31/52408

(Continued)

(56) References Cited

U.S. PATENT DOCUMENTS 2,503,563 A * 4/1950 Ray .................. F16K 41/16
251/128
4,949,937 A * 8/1990 Waldrum ............. F16K 31/04
251/129.11

(Continued)

FOREIGN PATENT DOCUMENTS

FR 579272 10/1924
WO 2004/003411 A1 1/2004

OTHER PUBLICATIONS

International Search Report and Written Decision of the International Searching Authority dated Dec. 19, 2013 for International Application No. PCT/EP2013/067875 (9 pages).

(Continued)

*Primary Examiner* — Craig Schneider
*Assistant Examiner* — Angelisa L Hicks
(74) *Attorney, Agent, or Firm* — Taylor IP, P.C.

(57) ABSTRACT

A switching or proportional valve has a valve drive, a valve body actuated by the valve drive, and at least one valve seat that, together with the valve body, delimits a flow cross-section for a flow medium conducted through the valve, wherein the flow cross-section is variable depending on the position of the valve body relative to the valve seat. The valve drive may be a rotary drive having a rotatable actuator, the actuator being coupled to the valve body in such a manner that the position of the valve body relative to the valve seat changes depending on the rotary position of the actuator. An eccentric element is rotationally related with the actuator. A spring-actuated return device with a plunger pressed by a spring against the eccentric element acts to return the eccentric element and the actuator to a starting position.

9 Claims, 3 Drawing Sheets

(58) Field of Classification Search
USPC .................................. 251/129.11, 251, 90
See application file for complete search history.

(56) References Cited

U.S. PATENT DOCUMENTS

| | | | | |
|---|---|---|---|---|
| 6,971,628 | B2* | 12/2005 | Ichimaru | ............... F16K 11/044 |
| | | | | 137/625.27 |
| 8,191,859 | B2* | 6/2012 | Min | ..................... F16D 41/069 |
| | | | | 251/129.11 |
| 8,858,164 | B2* | 10/2014 | Colotte | .................. F02K 3/075 |
| | | | | 251/251 |
| 2008/0245986 | A1 | 10/2008 | Arnault et al. | |
| 2010/0155630 | A1* | 6/2010 | Woerner | ................ F16K 11/06 |
| | | | | 251/28 |

OTHER PUBLICATIONS

Murrenhoff, H., Basics of Fluid Technology, 2005, Section 1: Hydraulic, p. 227, ISBN 3-8265-946-0, including an English translation of the document (6 pages).

* cited by examiner

PILOT VALVE AND/OR PROPORTIONAL VALVE

CROSS REFERENCE TO RELATED APPLICATIONS

This is a continuation of PCT application No. PCT/EP2013/067875, entitled "SWITCHING AND/OR PROPORTIONAL VALVE", filed Aug. 29, 2013, which is incorporated herein by reference.

BACKGROUND OF THE INVENTION

1. Field of the Invention

This invention relates to a pilot valve and/or proportional valve.

2. Description of the Related Art

Pilot valves and/or proportional valves are known in hydraulics, for example as piston slide valves. A valve slide or piston is moved in a valve housing relative to control edges such that desired flow cross sections for a flow medium that is guided through the valve and that is to be controlled result for various control positions of the valve slide. Another example has the valve designed as a rotary slide valve, such that the different control positions are defined by various rotational positions of the rotary valve relative to control edges in the housing.

Pilot controlled and directly controlled valves differ. With pilot controlled valves, the valve body is hydraulically moved, such that hydraulic valves are used for the generation of the hydraulic pilot forces, which as a rule are smaller and must work faster than the specified main stage. With directly controlled valves, an actuator, for example an electric motor or a solenoid, acts directly on the valve body of the main stage. Directly controlled valves are simpler in design. However, they are limited by the control forces that must be applied, the construction size, and the regulating speed of the valve body.

Independent of the actuating method, it is often demanded from hydraulic valves that, with the elimination of a control signal or when shifting the control circuits into an energy-free state, the valve body be moved into in a constructively defined position. This position is generally referred to as the failsafe position. In an energy-free control circuit, this position is also referred to as the starting position, and should entail a hydraulically defined and manageable, as well as a safe, state.

Traditionally with piston slide valves, the piston slides or valve bodies are acted upon both of their axial ends respectively by spring force in order to thereby push the piston slide mechanically into a central failsafe position if pilot pressures or control signals are turned off. See for example Murrenhoff, H., Basics of Fluid Technology, 2005, Section 1: Hydraulic, Page 227, ISBN 3-8265-946-0. The principle of spring centering, however, has disadvantages. The spring centered position is defined by the forces of equilibrium between the centering springs located at both face ends. Unavoidable friction and hysteresis results in the failsafe position being set only with uncertainty or with variance. Moreover, the spring centering force of both springs act continuously, in other words also during nominal operation of the valve. The operating force of the valve is always directed against the centering force, due to which a comparably higher operating force has to be applied. This again is detrimental in regards to adjustment accuracy, as well as to the costs and size of the valve drive.

What is needed in the art is a pilot valve or proportional valve, having a strongly reproducible failsafe position or starting position and wherein the centering force in nominal operation does not negatively affect the adjustment force.

SUMMARY OF THE INVENTION

The present invention provides a pilot and/or proportional valve with a valve drive and at least one valve body that is driven directly or indirectly by the valve drive. The valve body may also be described as a valve slide or piston, for example a rotary valve if the valve is in the embodiment of a rotary slide valve, or as piston valve if the valve is in the embodiment of a piston slide valve. Since the current invention can be used for any pilot valve and/or proportional valve, rotary slide valves in one design variation of the valve are described as a rotary slide valve, and piston valves in one design variation of the valve as a piston slide valve are described as valve body and the control edges which, together with the valve body determine the flow cross section are described as valve seats. The invention can moreover be used not only for piston slide valves and rotary slide valves, but can be used with additional valves having at least one valve body and one valve seat.

The pilot or proportional valve according to one embodiment of the invention has at least one valve seat that, together with the valve body, delimits a flow cross section for a flow medium conducted through the valve. The valve seat may, for example, be in the embodiment of the valve housing and can, by the control edges acting together with the valve body or corresponding control edges on the valve body, delimit the flow cross section for the flow medium flowing through the valve. The flow cross section is variable depending on the position of the valve body relative to the valve seat, in order to thus reduce the flow cross section partially or completely in one control position, and to enable it partially or completely in another control position.

The valve drive has a rotary drive having an actuator rotatable by way of a rotational axis. The actuator is coupled with the valve body, in particular mechanically in such a manner that the position or placement of the valve body relative to the valve seat changes depending on the rotary position of the actuator. This means that due to the rotary drive of the actuator, the flow cross section between valve body and valve seat is more or less opened or closed. The rotatable actuator may for example be driven by an electric motor, hydraulic motor, or pneumatic motor, wherein the drive shaft of the motor is designed as a single component with or rotationally coupled with the actuator. Alternatively, a gearbox may be provided between the drive shaft and the actuator, or another mechanical or non-mechanical connection may be used, such as a hydraulic or pneumatic drive connection in order to transfer the rotational movement of the drive shaft of the motor to the actuator. The motor may be for example a stepping motor.

According to another embodiment of the invention, an eccentric element is mounted eccentrically on the rotational axis of the actuator, wherein the eccentric element is rotationally connected with the actuator or may be a single component with same, thus rotating or respectively swiveling with the actuator. The eccentric element may thus be integrated with the actuator. According to an alternative design variation, the eccentric element may be mounted on its own additional rotational shaft and have a drive connection, in particular a mechanical drive connection, with the actuator, for example by way of a gearbox. The gearbox may have an output ratio in order to increase the torque during transfer to the eccentric element.

According to another embodiment of the invention, a spring operated reset device is allocated to the eccentric element that acts by rotating the eccentric element back about its rotational axis into a starting position or the so-called failsafe position. The reset device has a plunger that presses against the eccentric element by means of a spring. The spring may be in the embodiment of a compression spring or tension spring. However, other springs, for example pneumatic or hydraulic springs are also considered.

In order to avoid the resetting spring force acting by way of the plunger upon the actuator from interfering with the necessary rotational force that needs to be applied for operation of the valves in nominal operation, the reset device is advantageously equipped with a disengaging device that is operable by way of a control signal or a control pressure, and that is coupled with the plunger to act against the force of the spring. This causes the plunger to lift off the eccentric element when the control signal or the control pressure is present. This allows, in nominal operation of the valve, the eccentric element to rotate freely about its rotational axis that coincides with the rotational axis of the actuator. If the reset device is triggered in the event that the control signal or the control pressure becomes ineffective, the lift-off force of the disengaging device ceases so that, due to the spring force, the plunger is positioned against the eccentric element which rotates back into the starting position.

If the valve is designed as a rotary slide valve, the valve body may have a drive connection to the actuator for common rotation. The valve body may be connected to the actuator or may be designed as a single component the actuator. If the valve is designed as a linear piston slide valve, then the valve body may be connected with the actuator by way of a rack and pinion gearbox for conversion of a rotational movement into a linear movement. Another embodiment may use an eccentric rod or connecting bar that is connected eccentrically to the rotational axis of the actuator and that is connected also to the valve body. The eccentric element may further include the connecting point for the eccentric rod or connecting bar. The eccentric element can for example be positioned directly on the drive shaft of the drive motor, which may be a stepping or servomotor, or can be connected for rotation with same. The eccentricity relative to the rotational axis may then function as the connecting point for the eccentric rod or connecting bar that, at its other axial end, is connected to the valve body, which may be a piston valve with control edges which glides reciprocally in a valve housing. Other design variations may also be used as methods of conversion of rotational movement into linear movement. Reference is made as examples only to crank mechanisms or cam mechanisms, the latter for example with an eccentric that engages the valve body.

In order to achieve an especially reliable and at the same time low friction reset of the eccentric element into the starting position by means of the spring activated reset device, in particular by way of rotational pushing back with the plunger, the plunger may have a concave opening facing the eccentric element into which an opposing convex, in particular cylindrical or spherical surface, of the eccentric element engages, at least in the starting position with the plunger positioned against the eccentric element. According to one embodiment, the eccentric element engages only partially into the opening which is configured so that the plunger has a fork-shaped end facing the eccentric element. The surfaces of the eccentric element and the plunger facing each other may be designed so that a punctiform or linear contact occurs, which may be at two locations, namely in a forked arrangement at each fork end.

The disengaging device, by way of which the plunger is partially or completely lifted off the eccentric element against the spring force, may for example use a drive with an electromagnet or a hydraulic or pneumatic piston or similar device. Other embodiments, for example using mechanic levers which are connected to the valve body or are activated by the valve body may also be used.

According to another embodiment of the invention the plunger of the reset device has a double function. In this arrangement it acts not only with a reset force in a reset function of the eccentric element when the disengaging device is deactivated, but also provides at least one stop or alternately one stop in each rotational direction for the eccentric element and thereby also directly or indirectly for the actuator, in order to limit the adjustment track of the valve. According to another embodiment, the eccentric element is designed as a circular disk or cylinder, mounted eccentrically on its rotational axis.

Another embodiment has the starting position of the eccentric element, the connecting point of the connecting rod, the rotational axis of the eccentric element, and the effective direction of the spring force acting upon the plunger all positioned in-line.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
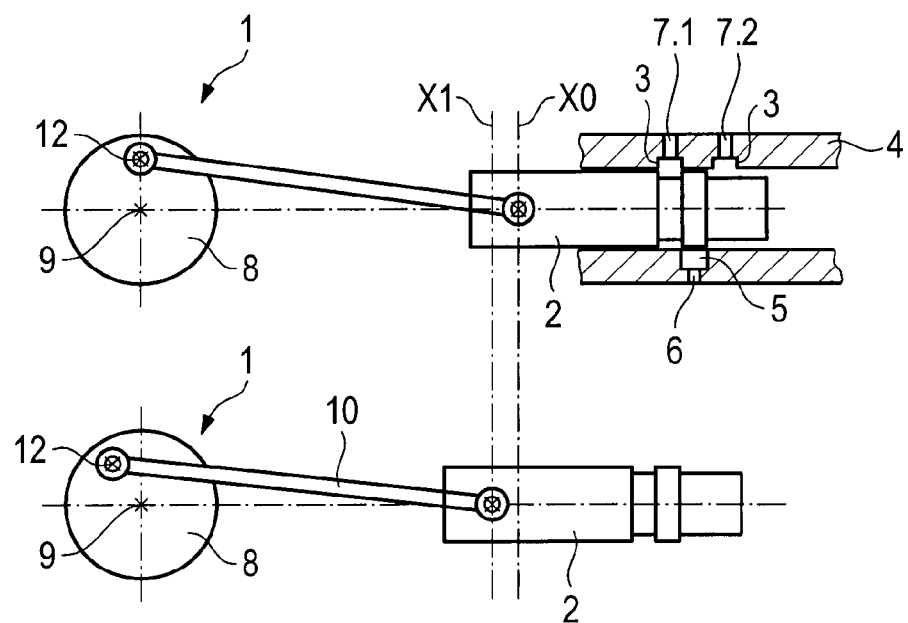
FIG. 1 shows a schematic illustration of a linear piston slide valve with motorized valve actuation.
Figure 3:
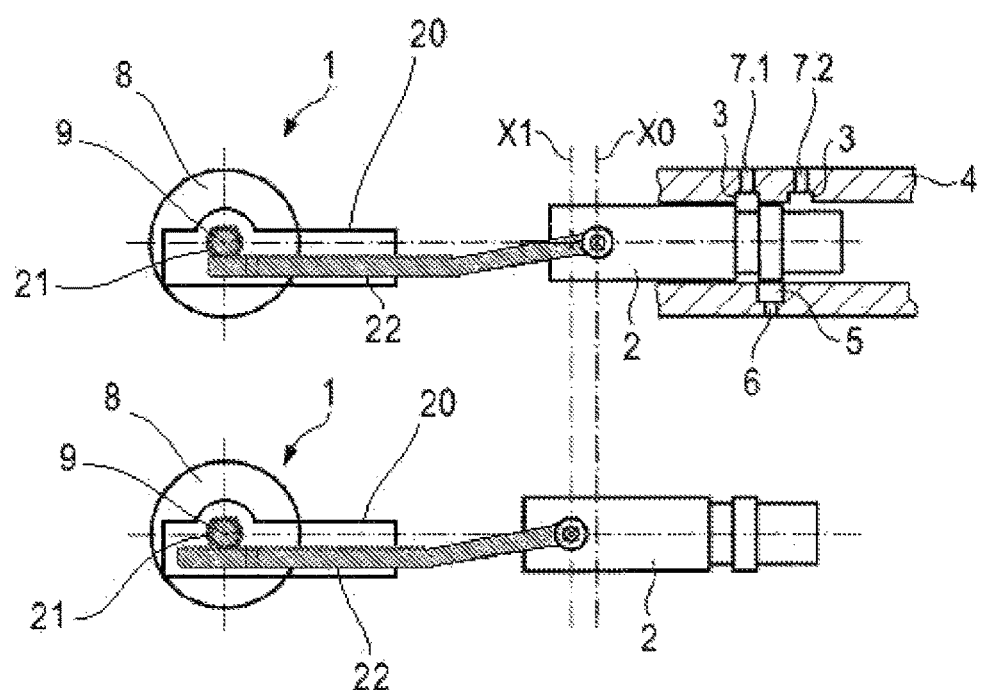
FIG. 3 shows a schematic illustration of another embodiment of a linear piston slide valve according to the present invention.

FIG. 1 illustrates a valve according to an embodiment of the invention having a proportional valve according to the piston slide design, with a valve drive 1 that actuates a valve body 2 so that it can work together with a valve seat 3 inside a valve housing 4, in order to more or less delimit the flow cross section of a flow path 5 through the valve. Depending on the position of the valve body 2, a flow medium flows from inlet 6 in the example through flow path 5 to outlet 7.1 or to outlet 7.2, depending on whether valve body 2 is pushed into the one or other direction from its starting position (X0) illustrated on top of FIG. 1. In the starting position in the illustrated example the flow path from inlet 6 to outlets 7.1, 7.2 is interrupted by valve body 2. Valve drive 1 comprises an actuator 8 that is rotatable about a rotation axis 9. Actuator 8 has a connecting rod 10 connected eccentrically relative to rotational axis 9, which is connected to valve body 2, thereby converting the rotational movement of actuator 8 into linear movement of valve body 2. An alternate embodiment is shown in FIG. 3, wherein actuator 8 has a rack and pinion gearbox 20 with its pinion 21 connected to the actuator 8 at rotational axis 9. The rack 22 of the rack and pinion gearbox 20 is connected to the valve body 2, thereby converting the rotational movement of actuator 8 into linear movement of valve body 2.

Figure 2:
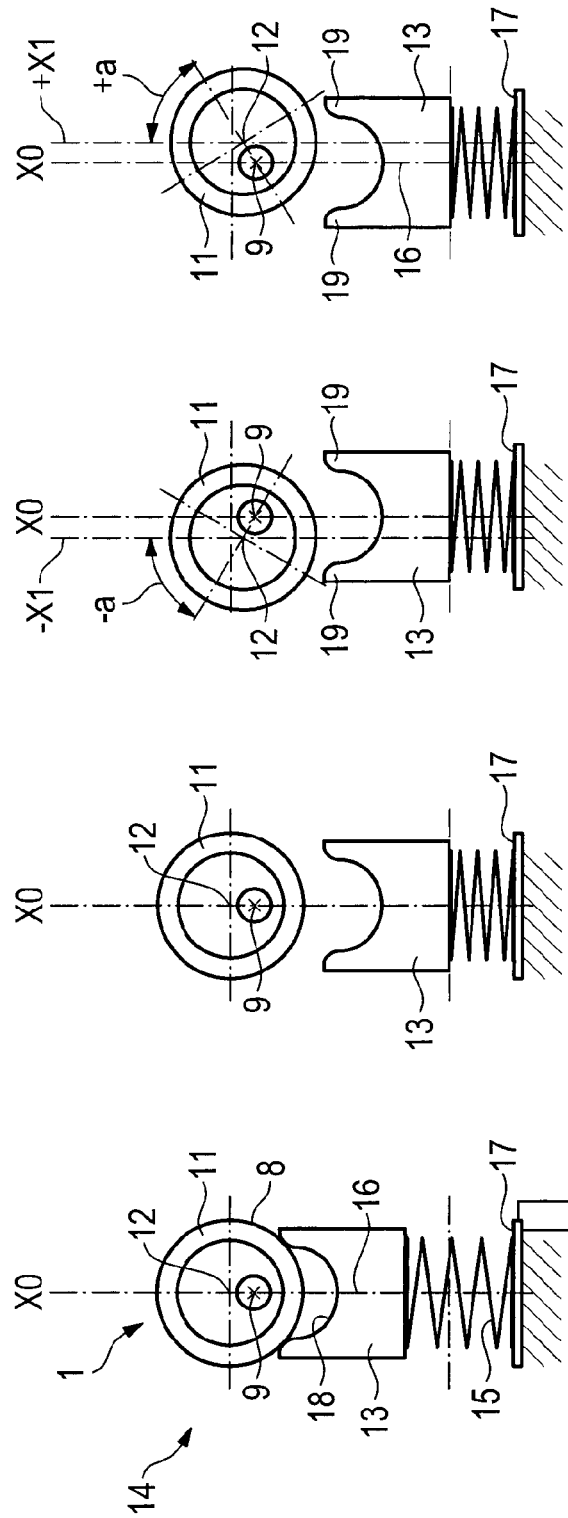
FIG. 2 shows an eccentric element and a spring operated reset device for a piston slide valve according to FIG. 1 in various control positions.

As illustrated in FIG. 2, actuator 8 is shown integrated with eccentric element 11, but the actuator 8 may alternately be connected to the eccentric element 11. The eccentric element 11 is now mounted eccentrically on rotation axis 9 in such a way that the eccentric element 11 together with connecting point 12 (see FIG. 1) is pivoted or tilted about rotation axis 9 when valve drive 1 is operated. When propelling valve drive 1 from starting position X0 into position +X1, eccentric element 11, together with connecting point 12 rotates in a first direction. In contrast, when shifting from the starting position X0 into position −X1 rotation occurs in a second opposite direction. During pivoting of eccentric element 11 via rotation axis 9, a lateral deflection occurs relative to spring operated plunger 13 of reset device 14, with regard to the direction of force of spring 15. In the current example this direction of force of spring 15 is along axis 16. The lateral deflection regarding the direction of force 16 during transition into position −X1 is opposite to the lateral deflection during transition into position +X1, according to angular deflection −α or respectively angular deflection +α, as illustrated in FIG. 2.

Plunger 13 is pressed against eccentric element 11 using the force of spring 15 as long as disengaging device 17 is not activated. Plunger 13 is illustrated with a fork-shaped end, formed by concave opening 18. Disengaging device 17 may for example be embodied as an electromagnet and acts against the force of spring 15 in order to lift plunger 13 off eccentric element 11. The non-activated state of disengaging device 17 is illustrated on the far left in FIG. 2, whereby spring 15 causes plunger 13 to be positioned against eccentric element 11. The activated condition of disengaging device 17 is show in the remaining illustrations, whereby plunger 13 is lifted off from eccentric element 11.

As shown in FIG. 2, in laterally deflected position of eccentric element 11 deactivating disengaging device 17 causes plunger 13 to be pressed against eccentric element 11 due to the spring force of spring 15, whereby said eccentric element acts in position X0 in terms of a reset into the starting position. At the same time, valve body 2 (see FIG. 1), separate from eccentric element 11 or formed integrally with eccentric element 11 is moved by way of actuator 8 into its starting position, the so-called failsafe position.

Even though the embodiment of the invention is illustrated as a piston slide valve, it is equally applicable to other valve designs, for example to a rotary slide valve. In such an embodiment, the eccentric element may be rotationally connected an appropriate rotary valve or may be formed integrally with the same, or may have a drive connection with the rotary valve so that when the eccentric element is moved into the starting position, the rotary valve is also moved into the starting position.

As can be seen in the laterally deflected positions of eccentric element 11, the fork-shaped end of plunger 13 provides a stop in each rotational direction in order to limit rotation of eccentric element 11 about rotation axis 9, and thereby also limits rotation of actuator 8 and the movement of valve body 2.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pilot valve or proportional valve, comprising:
   a valve drive and a valve body controlled by said valve drive;
   at least one valve seat that, together with said valve body delimits a flow cross section for a flow medium conducted through said pilot or proportional valve, said flow cross section being variable depending on a position of said valve body relative to said valve seat;
   said valve drive being a rotary drive having an actuator which is rotatable about a rotational axis and which is coupled with said valve body in such a manner that a position of said valve body relative to said valve seat changes depending on a rotary position of said actuator;
   an eccentric element mounted eccentrically on said rotational axis and rotationally related to said actuator; and
   a spring operated reset device engaged with said eccentric element, said spring operated reset device having a plunger that is pressed against said eccentric element by a spring, said spring operated reset device acting to rotate said eccentric element about said rotational axis into a single starting position substantially corresponding to an effective direction of said spring, wherein:
   said pilot or proportional valve further comprises a linear piston slide valve and said valve body being connected to said actuator through a connecting rod, said connecting rod being connected eccentrically to said actuator, relative to said rotational axis of said actuator.

2. The pilot valve or proportional valve according to claim 1, wherein:
   said spring operated reset device having a disengaging device coupled with said plunger, said disengaging device being operable in response to one of a control signal and a control pressure to act against a force of said spring, in order to lift said plunger off from said eccentric element when said one of said control signal and said control pressure is present.

3. The pilot valve or proportional valve according to claim 2, wherein:
   said plunger provides at least one stop in at least one rotational direction of said eccentric element when said disengaging device is active, said at least one stop limiting the rotation of said eccentric element.

4. The pilot valve or proportional valve according to claim 1, wherein:
   one of an electric motor, a pneumatic motor, and a hydraulic motor is connected to said actuator to provide rotation to said actuator.

5. The pilot valve or proportional valve according to claim 1, wherein:
   said plunger having a concave opening facing said eccentric element;
   said eccentric element having an opposing convex surface engaging said concave opening of said plunger.

6. The pilot valve or proportional valve according to claim 1, wherein:
   said eccentric element having a connecting point for said connecting rod, said connecting point being eccentric about said rotational axis.

7. The pilot valve or proportional valve according to claim 6, wherein:
said single starting position of said eccentric element, said connecting point for said connecting rod, said rotational axis of said eccentric element, and said effective direction of spring being positioned in-line.

8. The pilot valve or proportional valve according to claim 1, wherein:
said eccentric element being one of a circular disk and a cylinder.

9. The pilot valve or proportional valve according to claim 1, wherein
said single starting position being centered in a closed position of said valve body being located between a first open position of said valve body delimiting flow between an inlet and a first outlet, and a second open position of said valve body delimiting flow between said inlet and a second outlet.

\* \* \* \* \*

UNITED STATES PATENT AND TRADEMARK OFFICE
CERTIFICATE OF CORRECTION

PATENT NO. : 9,714,722 B2  
APPLICATION NO. : 14/640540  
DATED : July 25, 2017  
INVENTOR(S) : Jakob Hermann Page 1 of 1

It is certified that error appears in the above-identified patent and that said Letters Patent is hereby corrected as shown below:

In the Specification

Column 3
At Line 32, please delete "component the", and substitute therefore --component with the--.

Signed and Sealed this
Twenty-sixth Day of June, 2018

Andrei Iancu
*Director of the United States Patent and Trademark Office*